United States Patent [19]
Lord

[11] Patent Number: 4,795,246
[45] Date of Patent: Jan. 3, 1989

[54] DIFFERENTIAL INTERFERENCE CONTRAST MICROSCOPE USING NON-UNIFORMLY DEFORMED PLASTIC BIREFRINGENT COMPONENTS

[76] Inventor: Albert Lord, 943 Foul Bay Road, Victoria, British Columbia, Canada, V8S 4H9

[21] Appl. No.: 79,495

[22] Filed: Jul. 30, 1987

[51] Int. Cl.$^4$ .............. G02B 21/06; G02B 21/14; G02B 5/30
[52] U.S. Cl. .................. 350/510; 350/400; 350/405
[58] Field of Search ............ 350/510, 509, 524, 405, 350/400, 401, 403

[56] References Cited

U.S. PATENT DOCUMENTS

| | | | |
|---|---|---|---|
| 2,924,142 | 2/1960 | Nomarski | 350/510 |
| 3,558,210 | 1/1971 | Smith | 350/510 |
| 3,904,267 | 9/1975 | de Veer | 350/510 |
| 4,111,050 | 9/1978 | Waddoops | 356/44 |
| 4,566,761 | 1/1986 | Carlsen et al. | 350/401 |
| 4,629,637 | 12/1986 | Waldenrath et al. | 350/334 |

FOREIGN PATENT DOCUMENTS 260015 12/1985 Japan .................. 350/510

Primary Examiner—Jon W. Henry
Attorney, Agent, or Firm—Sidney T. Jelly

[57] ABSTRACT

In a differential interference contrast microscope, including a beam splitter and a compensator beam splitter, each of the beam splitters and the compensator comprise at least one non-uniformly deformed plastic birefringent component exhibiting linearly graded optical retardation between the ordinary and the extraordinary transmitted rays in one direction across the aperture and constant retardation in the orthogonal direction. The splitter and compensator may comprise a single unit for a reflected light microscope.

21 Claims, 5 Drawing Sheets

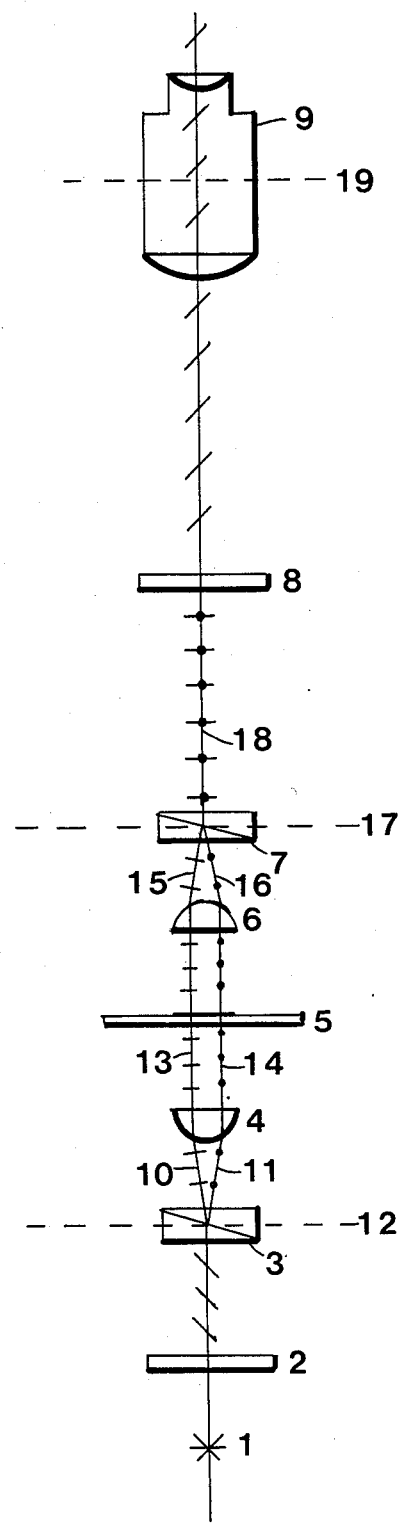
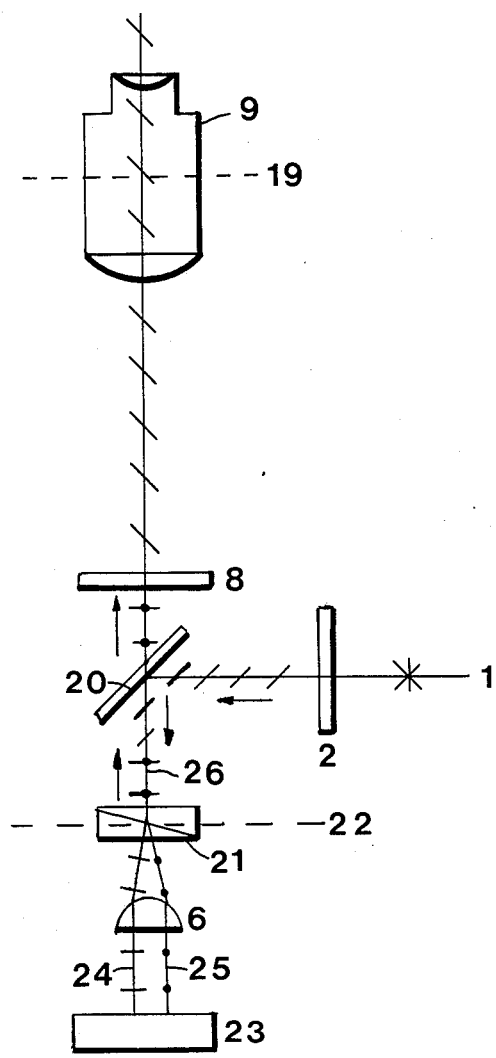
Fig. 1
Fig. 2

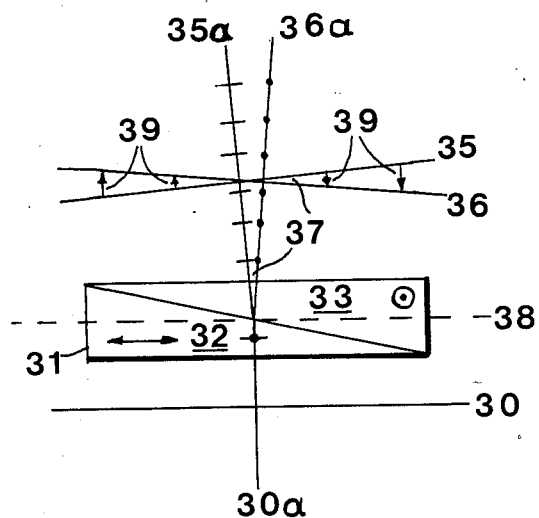
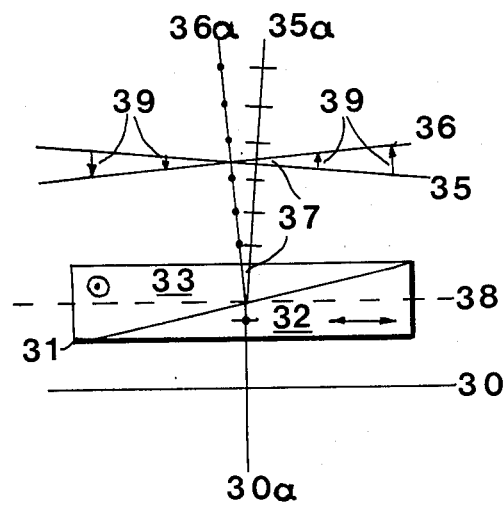
Fig. 3       Fig. 4
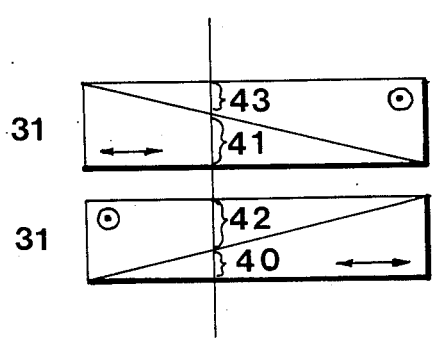
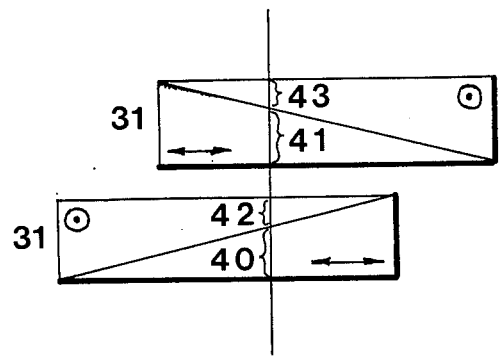
Fig. 5       Fig. 6
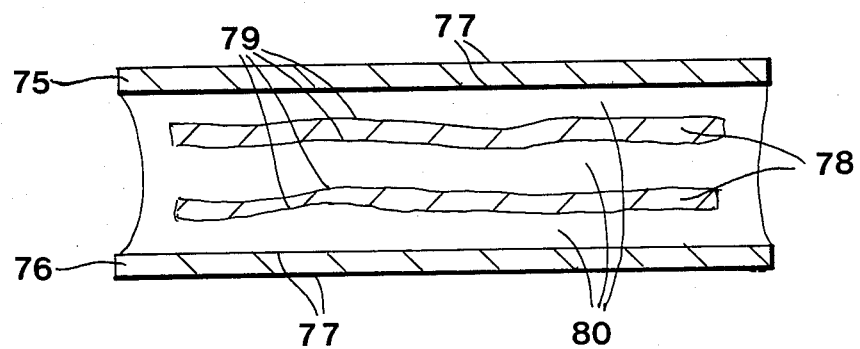
Fig. 11

DIFFERENTIAL INTERFERENCE CONTRAST MICROSCOPE USING NON-UNIFORMLY DEFORMED PLASTIC BIREFRINGENT COMPONENTS

BACKGROUND OF THE INVENTION

1. Field of the Invention

Many objects examined in the transmitted light microscope are highly transparent and colorless, and many objects examined with the reflected light microscope consist of substantially plane, mirror-like, surfaces on which the details of interest consists of very small topographical features having the same reflectivity as the surrounding surfaces.

Both of these kinds of objects are very difficult to examine because they neither absorb light nor deflect any significant amount of light out of the path of the objective. They therefore do not give rise to images showing significant local differences of intensity and hence are nearly or entirely invisible. The problem is most severe at high magnifications requiring objectives of large Numerical Aperture which accept light from a very wide angle.

2. Related Art

Many methods have been devised to render the detail in such objects clearly visible. All recognize that these types of objects produce phase changes in the light passing through or reflected from them. They are commonly referred to as phase objects. In transparent objects, phase changes are due to optical path differences resulting from local differences in thickness, refractive index, or both. In reflecting objects, phase changes are due principally to path differences caused by relative vertical displacements of different areas of the surface.

One class of microscopes devised to render phase objects visible is called Interference Microscopes. In these, light which has passed through or been reflected from an object is made to interfere with coherent light from the same source which has not passed through or been reflected from the object. Such microscopes tend to be complicated, expensive, difficult to use and give images which are difficult to interpret.

Another class which gives visible intensity contrast in images of phase objects is called Phase Contrast Microscopes. In these, light deflected by diffraction at the object is adjusted in phase with respect to the direct o undeflected light. The diffracted light is made to interfere with the direct light to give an intensity modulated image. Because the diffracted and direct light are not completely spacially separated, the Phase Contrast Microscope tends to produce annoying halos round large features, which can obscure nearby fine detail. However, such microscopes are widely used.

A more recent development is the Differential Interference Contrast Microscope, hereinafter, for convenience, referred to as a DIC microscope. Whilst the two classes of microscopes previously described render visible differences of phase in the object, the DIC microscope renders gradients of phase visible. Hence, the use of the word "differential" to indicate this sensitivity to the gradient or differential of phase. The background and areas of the object exhibiting uniform phase (whatever that phase might be) appear of the same intensity. Areas exhibiting phase gradients, such as edges, contours and concentration gradients, show up in lighter, darker or colored contrast against the background intensity. Visually the image gives the appearance of a three-dimensional object illuminated obliquely from one side. The observer can reverse the direction of apparent illumination and change from black and white to various colored contrast effects, at will.

To convert a regular transmitted light microscope to a DIC microscope, four components must be added: a polarizer, an analyzer and two prisms. The prisms are compound birefringent prisms of a general class known as Wollaston prisms, after their 19th century inventor. In a reflected light microscope, the objective also serves the function of a condenser. Hence, only one prism is required and the light passes through it twice.

SUMMARY OF THE INVENTION

It is an object of the present invention to enable the achievement of viable high power DIC microscope systems using inexpensive plastic components in place of costly quartz components as conventionally used in present DIC microscopes. Broadly, the invention provides for plastic "beam splitters" instead of quartz prisms, and a plastic compensator. The compensator, and the beam splitter, are formed of a plastic sheet deformed in a controlled manner, for example by stretching.

BRIEF DESCRIPTION OF THE DRAWINGS

The invention will be understood by the following description, in conjunction with the accompanying drawings, in which:

FIG. 1 is a diagrammatic illustration of the basic optical components of a transmitted light DIC microscope;

FIG. 2 is a diagrammatic illustration of the basic optical components of a reflected light DIC microscope;

FIG. 3 is a diagrammatic representation of a Wollaston prism;

FIG. 4 illustrates the prism of FIG. 3 rotated 180°;

FIG. 5 illustrates two prisms, one each as in FIGS. 3 and 4, stacked one above the other;

FIG. 6 illustrates relative lateral displacement of the prisms in FIG. 5;

FIG. 11 is a cross-section through a beam splitter;

DETAILED DESCRIPTION OF THE DRAWINGS

Figure 7:
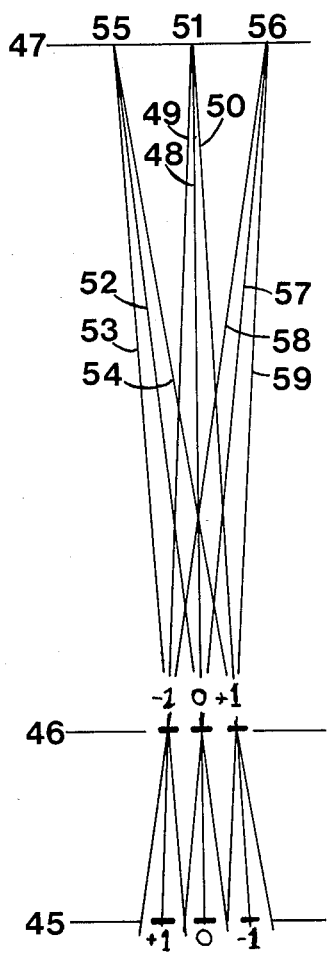
FIG. 7 illustrates the situation when the fringe systems of two prisms are positioned one above, and separated from, the other.

In FIGS. 1-6 the state of polarization of various rays and the orientation of optic axes of crystalline material are indicated by the following symbols: In birefringent crystalline material, a double headed arrow indicates that the optic axis is parallel with the plane of the figure and lies in the direction shown, whilst a circle with a central dot indicates that the optic axis is normal to the plane of the figure. A polarized ray vibrating parallel to the plane of the figure is shown as a line crossed at 90° by short bars. A polarized ray vibrating at 45° to the plane of the figure is shown as a line crossed at 45° by short bars and a polarized ray vibrating normally to the plane of the figure is shown as a line with dots. A ray composed of two polarized components vibrating parallel and normal to the plane of the figure is indicated by a line having dots and crossed a 90° by short bars.

To appreciate the features of the present invention it is useful to describe the basic construction and operation of a conventional DIC microscope.

FIG. 1 shows an ideal arrangement of the basic optical components of a transmitted light DIC microscope. The passage of a single axial ray 1 is traced through the system. Light passes in sequence through a polarizer 2, a first prism 3, a substage condenser 4, the object slide 5, the objective 6, a second prism 7, an analyzer 8 and an eyepiece 9. Whilst these components are those relevant to this explanation, the microscope would also include other conventional optical components which might include a light source with condensing means, a binocular head etc., which are not shown but are conventional.

The polarizer is set with its vibration direction at 45° to the fast and slow vibration directions of the birefringent crystals of the prisms. The polarized ray is split into two components vibrating in the fast and slow directions of the material of the prisms. The splitting takes place at a plane which is ideally located at the lower focal plane 12 of the substage condenser 4, the rays travelling in paths 10 and 11. After passing through the condenser, the rays travel in parallel but slightly separated paths 13 and 14 through the object slide 5. The system is so designed that the lateral separation of the two components is approximately equal to the resolving power of the microscope. After passing through the objective 6 they follow convergent paths 15 and 16 which meet at the upper focal plane 17 of the objective. Ideally the second prism is located so that they are brought back to a common path 18. The analyzer 8 serves to resolve the two vibrational components into a single vibration direction in order to permit interference effects to be observed in the intermediate image plane 19 by means of the eyepiece 9. The analyzer is usually kept in the crossed position relative to the polarizer.

It will be apparent that the plane 12, at which the ray 1 is split into divergent components 10 and 11, and the plane 17, at which convergent components 15 and 16 meet, are conjugate planes, and that the first prism 3 is in fact imaged on the second prism 7 by the combined action of the condenser 4 and the objective 6. It will also be apparent that it is a necessary condition that the two prisms are located with their splitting planes in conjugate planes and that the splitting angle of prism 7 matches the angle of convergence of components 15 and 16 if the two components are to be recombined into the common path and direction 18.

The reflected light DIC microscope is built on the same principle as the conventional metallurgical microscope, in which the objective serve the function of both condenser and objective. Consequently, only one prism is required. The arrangement of basic optical components normally used is shown in FIG. 2. A single axial ray is again traced through the system by way of illustration, common reference numerals being used where applicable.

The axial ray 1 passes through the polarizer 2 and is reflected vertically downwards at the 45° semi-reflecting glass plate 20. The orientation of the polarizer is such that the polarized ray is vibrating at 45° to the fast and slow vibration directions of the birefringent crystals of the prism 21, which ideally is located at the upper focal plane 22 of the objective 6. After passing through the objective, the two components follow parallel but slightly separated paths 24 and 25 to the mirror-like object 23. They are reflected back along substantially the same paths to the objective 6, which focusses them back to the upper focal plane 22. The second passage through the prims 21 recombines them along a common path 26. It will be apparent that in this set-up the prism is imaged back onto itself by the focussing action of the objective combined with the reflective action of the mirror-like object. Since the same prism is used both to split the ray 1 into divergent components and to recombine them into common path 26 it will also be apparent that it must be located with its splitting plane at the upper focal plane 22 of the objective.

In real systems, it is not possible to place the prisms in their ideal locations except in very low power microscopes. This is because high powered objectives and condensers ar combinations of several lenses and the rear focal planes are usually located within the lens system or at least very close to the lenses and generally within the lens mounts.

A solution to this problem was proposed by G. Nomarski, who designed a prism, now known by his name, in which the splitting plane is located some distance outside the prism structure. Such a prism can be placed outside a complex component such as a high powered condenser or objective and still have its splitting plane coincident with the internal focal plane of the component. It is not proposed to discuss the theory and structure of the Nomarski prism, but it is relevant to note that it entails using thicker crystalline material with a different crystallographic orientation than is usually used in the construction of Wollaston prisms. DIC microscopes utilizing Nomarski type prisms are widely used and the system has enjoyed considerable commercial success.

A major part of the cost difference between a regular microscope and a DIC microscope lies in the high cost of fabricating the prisms.

As previously stated, it is an objective of this invention to enable high power DIC microscopes, for both transmitted and reflected light, to be constructed using low cost plastic components for the beam splitting function thereby significantly reducing the overall cost. To appreciate this it is useful to explain in more detail the structure and action of beam splitting prisms in the DIC microscope and the undesirable consequences of having these components in theoretically non-ideal locations in the optical system.

A Wollaston prism is constructed from two equal wedges of birefringent crystalline material, usually quartz. The angle of the wedges is usually very small for DIC use. The two wedges are assembled to form a parallel sided composite plate. The quartz is cut with the optic axes in the plane of the plate in order to maximize the difference in the ordinary and extraordinary refractive indices for rays travelling normal to the plate. In one wedge, the optic axis is parallel to the wedge edge, and in the other is at 90° to this direction. With such an arrangement, the ordinary ray in one wedge becomes the extraordinary ray when it passes into the other and vice versa. Hence, the net retardation at any point is proportional to the difference in thickness between the two orientations of quartz at that point. At the centre, where the thicknesses of the two wedges is equal, the net retardation is zero and increases linearly with distance from that point, being of opposite sign on opposite sides. There is no gradation of retardation parallel to the wedge edges, i.e. at 90°, to the plane of FIG. 3, which illustrates the features of Wollaston prisms just described.

In FIG. 3, a wavefront 30, polarized at 45° to the optic axes, is shown incident normally on a Wollaston prism 31 composed of the quartz wedges 32 and 33. The wave is resolved into two components 35 and 36, each one vibrating parallel to one of the optic axes of the quartz wedges. The corresponding rays are numbered 30a, 35a and 36a. The angle 37 is the splitting angle and the plane 38 is the splitting plane. The net retardation between the two components wavefronts emerging from tee prism is indicated at various points by the vertical arrows 39 between them. At points where the retardations are equal to 0, 1, 2, 3... etc. (i.e. whole) wavelengths, the emerging light is in phase. At intermediate points where the retardation is ½, 3/2, 5/2... etc. wavelengths, the light is 180° out of phase. When viewed through an analyzer, crossed with respect to the incident polarized wave, the Wollaston prism is seen to be crossed by dark interference fringes located where the net retardation equals whole wavelengths. The fringes are spacially localized in the splitting plane 38. In white light, the zero order fringe (i.e. where the retardation is zero) is achromatic The other fringes display a sequence of colors on either side due to the dependence of fringe spacing on wavelength.

If the prism 31 of FIG. 3 were rotated 180° about a vertical axis, it would appear as in FIG. 4, reference numerals being common with FIG. 3. Note that the direction or sign of retardation has been reversed on either side of the centre but the visual appearance of the fringes is unchanged.

If two identical prisms 31, oriented as in FIGS. 3 and 4, were stacked one above the other with fringes of equal order number aligned, the total thickness of quartz of each orientation would be equal at any point. This is shown in FIG. 5, where the thicknesses (40+41) minus (42+43) equal zero. Hence, there is zero retardation everywhere and the Wollaston prisms appear dark when viewed through a crossed analyzer.

If one of the prisms of a pair, stacked as in FIG. 5, were displaced to the left o right with respect to the other, the total thickness of quartz of each orientation would be everywhere unequal by a constant amount, depending on the extent of the displacement. In FIG. 6, the thickness (40+41) minus (42+43) is non-zero and constant across the overlapping area of the prisms.

If the displacement of the prism is progressively increased, the value of the uniform retardation across the overlapping area changes sequentially through all the values present in the set of fringes due to one prism alone. Hence, if viewed through a crossed analyzer in monochromatic light, it passes from dark to light to dark and so on. In white light, it passes sequentially through all the colors displayed in a set of white light fringes of one prism alone.

Exactly the same effect can be produced if, instead of stacking the prisms, one prism is imaged onto the other by means of a suitable lens system. The magnification of the lens system and the fringe spacing of the separate prisms must be such that the projected fringe system matches in size the fringe system of the prism onto which it is projected. This is exactly the situation in an ideal transmitted light DIC microscope where the condenser and objective image the first prism onto the second. By moving one prism laterally, the observer may change the intensity or color of the light uniformly across the microscope aperture. This sets the intensity or tint of the background areas and of areas of uniform phase in the object. Areas of phase gradient in the object modify the retardation locally, causing those details to be seen in contrast against the background tint.

DIC can give rise to many different contrast effects on the same object, including bright contrast against a dark field when the background retardation is zero, through black and white with an appearance of three dimensions, against a grey background, when the background retardation is less than half a wavelength, to various color contrasts against colored backgrounds for greater background retardations. It is important to note that any of these effects can be achieved simply by adjusting the background retardation to the appropriate level. This in turn can be effected by inserting a suitable retardation device into the optical system anywhere between the polarizer and analyzer or, more simply, by relative lateral adjustment of the prisms as just discussed.

It is now appropriate to consider the effect of axial separation between the image of the first prism and the second prism. This is the case, for example, when the image of the first prism is down inside the objective mount and the second prism is necessarily located outside the objective. If the prisms are simple Wollaston prisms or plastic equivalents, the splitting planes of the first prism image and the second prism will be axially separated.

Let us assume that the positions of the fringes of various orders have been marked on the prisms so that they are still known when the fringes themselves are not visible due to compensation. Let us also assume that the two fringe systems have been matched for size as viewed from a point in the intermediate image plane, i.e. the fringe system of the second prism is slightly smaller to compensate for its location somewhat nearer the viewpoint.

FIG. 7 illustrates the arrangement in which the image of the first prism is located at plane 45, the second prism is located at plane 46, and the intermediate image is at plane 47. The black bars in planes 45 and 46 represent the locations of the two fringe systems and are labelled with the order number of the fringes. Note that the two systems are oriented in opposition as required for compensation. The rays 48, 49 and 50 are converging to form image point 51. The ray 48 passes through regions giving zero retardation in both systems and hence the net retardation is zero. Similarly, the net retardation for ray 49 is $+1-1=0$ and for ray 50 is $-1+1=0$. Thus, for image point 51, the retardation is uniformly zero across the aperture. With a crossed analyzer, this area of the field would be dark and any object detail would show in lighter contrast. Rays 52, 53 and 54 are converging to form image point 55. By like reasoning, the net retardations for these rays are $-\frac{1}{2}+0=-\frac{1}{2}$, $+\frac{1}{2}-1=-\frac{1}{2}$ and $-1\frac{1}{2}+1=-\frac{1}{2}$. Thus, for image point 55 the net retardations is uniformly $-\frac{1}{2}$ across the aperture. With a crossed analyzer, this area of the field would be bright and any object detail would show in rather poor dark contrast. It is apparent that the net retardation at image point 56, formed by rays 57, 58 and 59, is $+\frac{1}{2}$.

In the regions between image point 51 and image points 55 and 56, the field would pass through the sensitive grey tint against which object detail has the appearance of three dimensions with oblique illumination. However, the illumination would appear to be coming from opposite directions on opposite sides of 51.

Similar evaluations of the net retardations at image points beyond 55 and 56 show that the retardation continues to increase linearly across the field. There is no variation of retardation at 90° to the plane of FIG. 7. Hence, the field is crossed by a set of interference fringes similar to those displayed by a Wollaston prism and the nature of the interference contrast varies accordingly.

It is to be noted that these effects are the inevitable result of the axial separation of planes 45 and 46. The background tint of the field and the accompanying contrast type can be changed from any value to any other value by the appropriate adjustment to the background retardation. It has been shown how this can be effected by lateral adjustments of the prisms. It can also be achieved by inserting an appropriate retardation device anywhere in the optical system between the polarizer and the analyzer. However, both of these methods affect all areas of the field uniformly and therefore cannot be used to eliminate interference fringes in the field plane.

Considering now the particular features of the present invention, the Wollaston prisms can be replaced by plastic (synthetic resin) members, hereinafter referred to as "beam splitters", in that although acting as beam or ray splitters, they are not physically prisms.

Most transparent plastic materials, including acrylics, polycarbonates, polystyrene, cellulose acetate, etc., are optically isotropic when strain free but become birefringent when the molecules are partially aligned as, for example, by stretching. The amount of optical retardation given by a given thickness of the plastic material increases with the degree of elongation. Hence, it is possible to make plastic retardation devices in which the starting thickness was substantially uniform but in which the amount of retardation varies locally with the amount of deformation. Plastic materials may be stretched and left with a stable residual birefringence by a number of techniques including heating to softening point, stretching and holding under tension until cold, or softening by saturating with the vapour of a suitable solvent, and stretching and holding under tension until the solvent has evaporated.

The two principal optical vibration directions in stretched plastic are aligned parallel to and at 90° to the direction of elongation. Consequently, if two pieces of similar stretched plastic are stacked together so that light passes through them sequentially, the total retardation produced by them will be equal to the sum of the retardations produced by each separately, if the elongation directions are aligned but will be equal to the difference if the elongation directions are at 90°. The latter case is known as the compensating mode.

Figure 8:
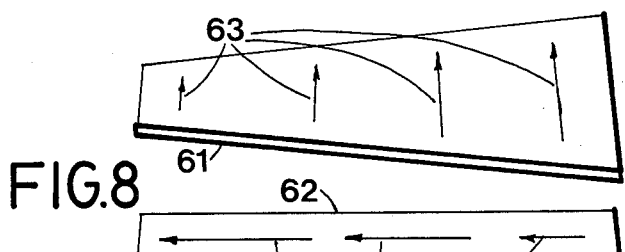
FIG. 8 illustrates an arrangement of two plastic members elongated non-uniformly in two directions normal to each other.

In FIG. 8, two members 61 and 62, of stretched plastic, are shown in perspective view. The arrows 63 and 64 are intended to show, in direction and length, the direction of stretching and the degree of local elongation Member 61 has been stretched at 90° to the plane of the Figure with elongation increasing from left to right. There is no variation of elongation at 90° to the plane of the Figure. It is to be assumed that the stretching has been controlled to give a linear increase of retardation from left to right. Member 62 has been stretched parallel to the plane of the Figure with elongation increasing from right to left. Again, there is no variation of elongation at 90° to the plane of the Figure. It is to be assumed that the stretching has been controlled to give a similar linear increase of retardation from right to left. It is also to be assumed that the magnitude of retardation in the two pieces is equal at the centre.

If each of these two members were viewed separately between crossed polars, with the direction of vibration at 45° to the plane of the Figure, they would display similar straight interference fringes at 90° to the plane of the Figure, equally spaced and with the fringe order increasing from left to right in member 61 and right to left in member 62. The same order fringe would be located at the centre of each. They would therefore each behave like one of the quartz wedges constituting a Wollaston prism. If stacked close together, oriented as shown, and viewed similarly between crossed polars, they would display a set of interference fringes with half the previous spacing and with the zero order fringe at the centre, exactly as is the case when the two quartz wedges of a Wollaston prism are assembled to form a complete Wollaston prism.

The foregoing demonstrates how a device which simulates the optical behaviour of a Wollaston prism may be fabricated in plastic. The useful property of a Wollaston prism of producing linearly graded retardation with zero retardation at the centre of its aperture can be obtained with other structured forms in plastic which are equally useful for DIC beam splitters.

Figure 9:
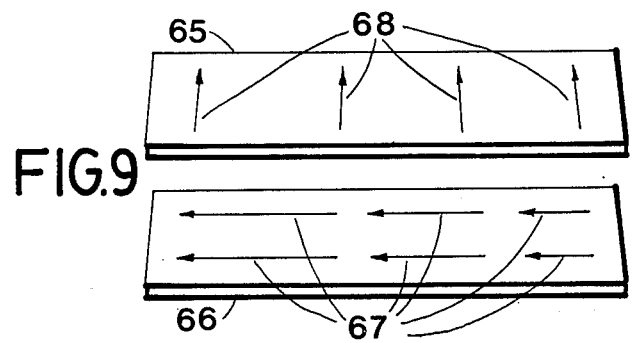
FIGS. 9 and 10 illustrate two alternative arrangements in which only one of two plastic members is elongated non-uniformly and the other is elongated uniformly.
Figure 10:
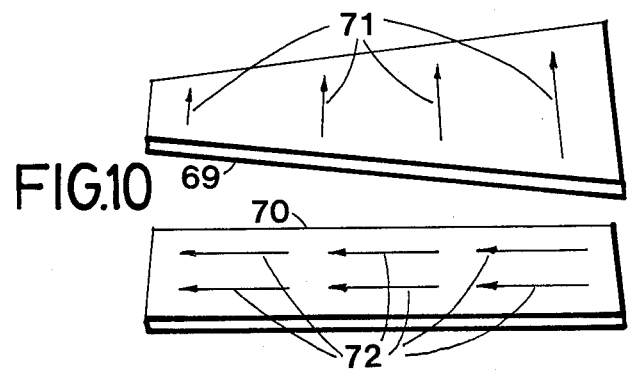

FIGS. 9 and 10 show two such structures. In FIG. 9, two members 65 and 66 are superimposed. Member 66 is stretched non-uniformly while member 65 is stretched uniformly. This is indicated by the varying length of arrows 67 in member 66 and the constant lengths of arrows 68 in member 65. In FIG. 10, member 69 is stretched non-uniformly as indicated by arrows 71 and member 70 is stretched uniformly as indicated by arrows 72.

Thus, FIG. 9 shows a lower member, similar to member 62 of Figure B, in combination with a piece of uniformly stretched plastic. The latter component is arranged to produce the same degree of retardation as the central region of the first member. Since these two members are oriented in the compensating mode, the combination gives zero retardation at the centre with increasing retardation of opposite sign on either side, as does a Wollastom prism. FIG. 10 shows an equivalent arrangement using an upper member similar to member 61 of FIG. 8 in compensating combination with a uniformly stretched member. The order of stacking is of no consequence. It should be noted that in FIGS. 8, 9 and 10 the pairs of members 61, 62; 65, 66; and 69, 70 are shown separated vertically for clarity. In real devices, they would be mounted in close contact.

It will be apparent that if the devices illustrated in FIGS. 9 and 10 were used as the two birefringent components of a DIC system, the two pieces of uniformly stretched material would exactly compensate each other and have no effect on the overall system. Hence they could be removed without any apparent effect on the performance of the DIC system. This demonstrates that a satisfactory DIC system can be set up using only one piece of non-uniformly stretched plastic in place of each of the normal quartz DIC prisms.

Thus, it will be seen that there are many possibilities which do not necessarily simulate either the Wollasten prism structure or characteristics closely, but which can be used in DIC systems instead of quartz prisms. They do, however, all have one characteristic in common which is critical to their function in DIC. All these devices incorporate at least one member which displays linearly graded optical retardation across its aperture. In existing commercial DIC systems, this property is provided by quartz wedges. In the present invention, it is provided by non-uniformly deformed plastic.

Plastic film as normally supplied does not have a high quality surface finish by the standards required for optical instruments. It may be further degraded by the process of stretching. Hence, if introduced into a high quality optical system such as a microscope, it might cause sufficient distortion of the wavefront to degrade the image in an unacceptable manner. Therefore, when utilizing plastic films in optical instruments, they are customarily mounted in a medium of matching refractive index between optically flat glass plates. This ensures that no refraction occurs at the plastic surface and the entire structure behaves as if all surfaces were optically flat.

When plastic is deformed to create birefringence, its refractive index is split into two slightly different values for light vibrating in two orthogonal directions. However, in the present case, this splitting is very slight and if the plastic is mounted in a medium of the mean refractive index, any residual distortion at surface defects due to mismatch of refractive index will be well within normally accepted criteria for wavefront distortion in an image forming optical system.

An example of a complete plastic beam splitter in accordance with the above description is shown in cross section in FIG. 11, where vertical dimensions have been exaggerated for clarity. Two glass plates 75, 76 have polished optically flat surfaces 77 and lie parallel to one another. Plastic members 78, which may be one or more in number, have surfaces 79 which may deviate significantly from optical flatness. All intervening space is filled with a transparent medium 80, which has a refractive index matching the mean refractive index of plastic layers 78.

In the arrangements so far described, the plastic beam splitting devices have the splitting planes within the device. No method is known for making a single plastic beam splitting device with the beam splitting plane lying substantially outside the device, as can be obtained with a Nomarski modified Wollaston prism.

In a high powered microscope with high aperture condenser and objective, both of complex construction, the closest accessible locations for the two beam splitters lie below the lower focal plane of the condenser (FIG. 1, plane 12) and above the upper focal plane of the objective (FIG. 1, plane 17). The effect of placing the first beam splitter below plane 12 is that it is imaged below plane 17, thereby increasing the separation between it and the second beam splitter which is necessarily above plane 17. With plastic beam splitters having internal splitting planes, the situation as illustrated in FIG. 7 and as described above therefore occurs.

Figure 12:
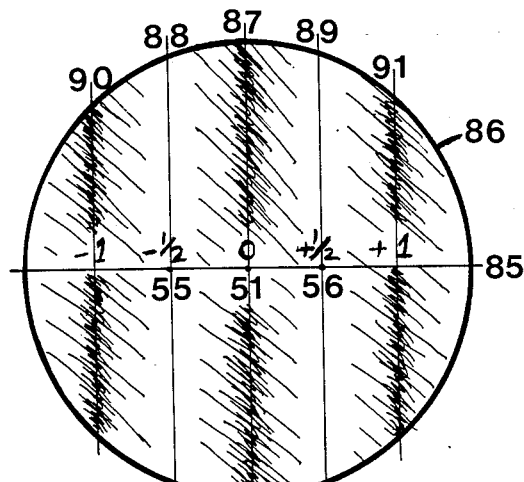
FIG. 12 is a diagrammatic illustration of the image as seen in the eyepiece of a microscope, with a beam splitter in position.

FIG. 12 shows the intermediate image plane (FIG. 7, plane 47) as see in the eyepiece of the microscope. The plane of FIG. 7 is normal to the paper through line 85 of FIG. 12 and points 51, 55 and 56 are shown again with like numbering. The circle 86 represents the eyepiece diaphragm which limits the field of view Along the line 87 which passes through point 51, the retardation is zero, so a zero order dark fringe is centred along this line, as would be expected between crossed polars. Along line 58 through point 55, the retardation is $-\frac{1}{2}$, so a bright fringe is located along this line, as would be expected for a half wavelength retardation between crossed polars. Similarly, there is another bright fringe along line 89 through point 56, where the retardation is $+\frac{1}{2}$. Proceeding out beyond points 55 and 56, the retardation continues to increase and first order dark fringes occur along lines 90 and 91, where the retardation is minus and plus one whole wavelength respectively.

Clearly to bring the entire field to some common adjustment, say zero retardation, different degrees of compensating retardation must be applied to each strip element of the field parallel to the lines 87, 88, 89, etc. This compensation must everywhere be of the same magnitude but of opposite sign from the local retardation, so that the net retardation everywhere sums to zero. A compensator to achieve this must display a pattern of compensation which is the exact complement of the retardations causing the fringes in the field plane. Further, in order that the correct specific compensation should be applied to the full cone of rays converging on each image point, there must be no parallax between the compensator and the image. For this to be so, the compensator must be located in the image plane or projected into it from a conjugate optical plane.

Figure 13:
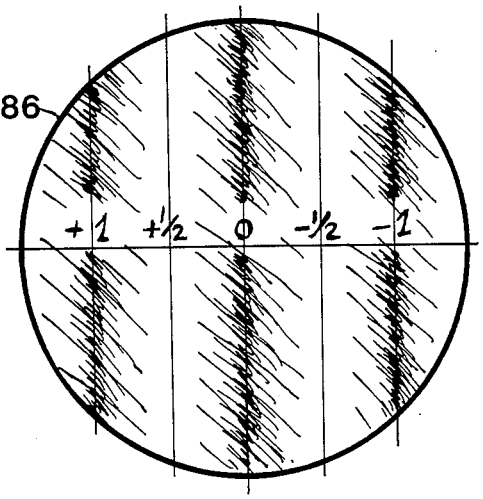
FIG. 13 is a diagrammatic illustration of a field compensator as it would appear in the eyepiece of a microscope.

FIG. 13 illustrates a compensator designed to correct the field shown in FIG. 12 as it would appear viewed alone between crossed polars. It displays a set of interference fringes identical in appearance to those of FIG. 12, but the fringe order numbers are of opposite sign. If placed in the image plane, as in FIG. 12, oriented as shown, the net retardation would everywhere be zero and the whole field would appear dark. Slight lateral displacement of the compensator to the left or right, without rotation, would cause the retardation over the whole field to become non-zero and progressively negative or positive, respectively, in a uniform manner.

The field compensator is made in a similar manner as a beam splitter, that is, it incorporates a non-uniformly stretched sheet of plastic material, and conforms to one of the structures shown in FIGS. 8, 9 or 10.

The addition of a field compensator produces the same effect as if the splitting plane of the second beam splitter had been shifted down to coincidence with the image of the first beam splitter (plane 45 of FIG. 7), just as in the case of the Nomarski prism. Although a single plastic beam splitter cannot be made to simulate a Nomarski prism, it can be shown that the second beam splitter and the field compensator act together in combination in just that way.

It will be appreciated that although a transmitted light DIC microscope may incorporate two beam splitters, each in a theoretically non-ideal location, the resultant phase gradients in the image plane may be corrected by a single field compensator.

There are several reasons why it would not be convenient to fit the field compensator in the intermediate image plane which is frequently located within the eyepiece. In a binocular microscope two compensators would be required, the eyepieces would have to be fixed against rotation and presence of the compensator would make changing eyepieces less simple.

A more favorable location for the field compensator is a the field diaphragm of the illuminating system. In most modern microscopes with built-in illumination (either transmitted or reflected), there is a diaphragm, usually an adjustable iris, which is imaged onto the object for the purpose of limiting the illuminated field in order to minimize glare. Its plane is therefore conjugate with the intermediate image plane. Since all the birefringent components must lie between the polarizer and the analyzer, a suitable arrangement is that illustrated in FIG. 14.

Figure 14:
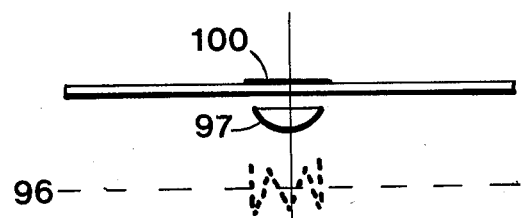
FIG. 14 illustrates the position of a field compensator in a transmitted light DIC microscope.
Figure 14:
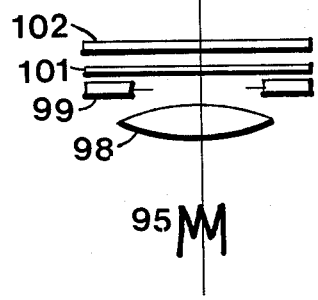

In FIG. 14, a lamp is shown at 95, and is imaged on the lower focal plane 96 of the substage condenser 97 by the lamp condenser 98. A field iris 99 is located just in front of the lamp condenser and is imaged on the object 100 by the substage condenser 97. The polarizer 101 and field compensator 102 are located close to the field iris 99. Hence, the field compensator is imaged close to the plane of the object, minimizing any parallax between them.

Figure 15:
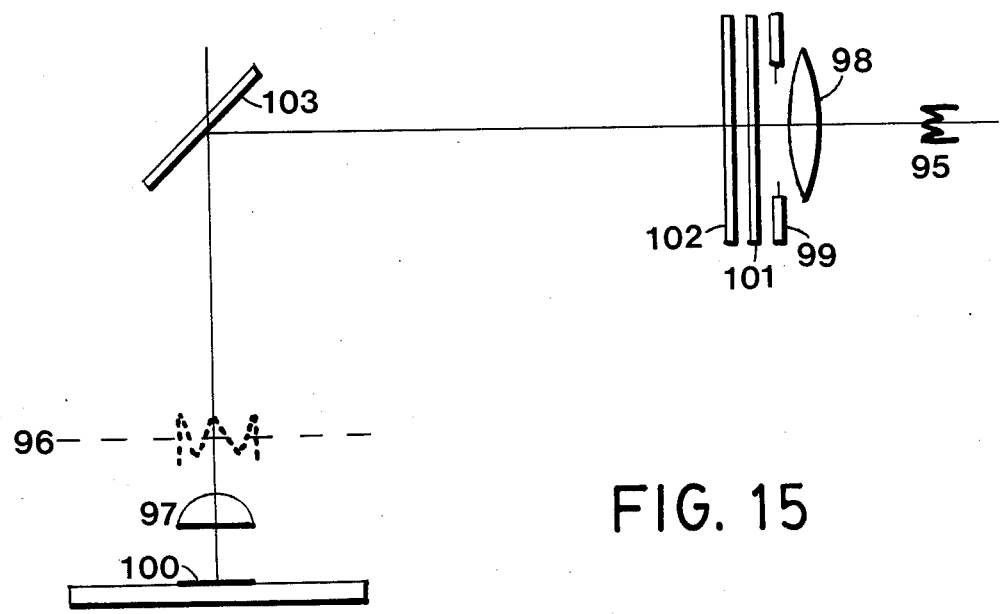
FIG. 15 illustrates the position of a field compensator in a reflected light DIC microscope.

FIG. 15 illustrates an equivalent arrangement for a reflected light microscope. The same reference numerals are used for the same items as in FIG. 14. Thus, the lamp is imaged on the upper focal plane 96 of the objective 97 by the lamp condenser 98, the light rays being deflected via 45° mirror 103. Field iris 99 is located just in front of the lamp condenser and is imaged on the object 100 by the objective 97, which is also acting as the condenser. The polarizer 101 and field compensator 102 are located close to the field iris 99 and the field compensator is imaged close to the plane of the object.

While in this description stretching has been given as an example of one method of producing partial molecular alignment in plastic materials in order to render them birefringent, it should be noted that other methods of controlled deformation, such as extrusion, rolling etc. may also be used to form plastic beam splitters suitable for use in the DIC microscope.

In summary, satisfactory DIC can be achieved at high magnifications even if the splitting places of the two prisms or beam splitters are axially separated, since the resultant interference fringes in the image plane can be compensated out by the use of a third birefringent device, the field compensator. It will be appreciated that the two DIC beam splitters and the field compensator are optically similar devices. The essential property of each of these devices is that it splits an incident polarized ray into two slightly divergent components polarized in mutually perpendicular directions. A device to perform this essential function can be fabricated very cheaply in plastic, whereas it is very costly to fabricate in quartz. Hence, a low cost DIC system can be achieved in which plastic devices replace the usual quartz DIC prisms, and a third plastic device is used as a field compensator.

Figures 16, 17:
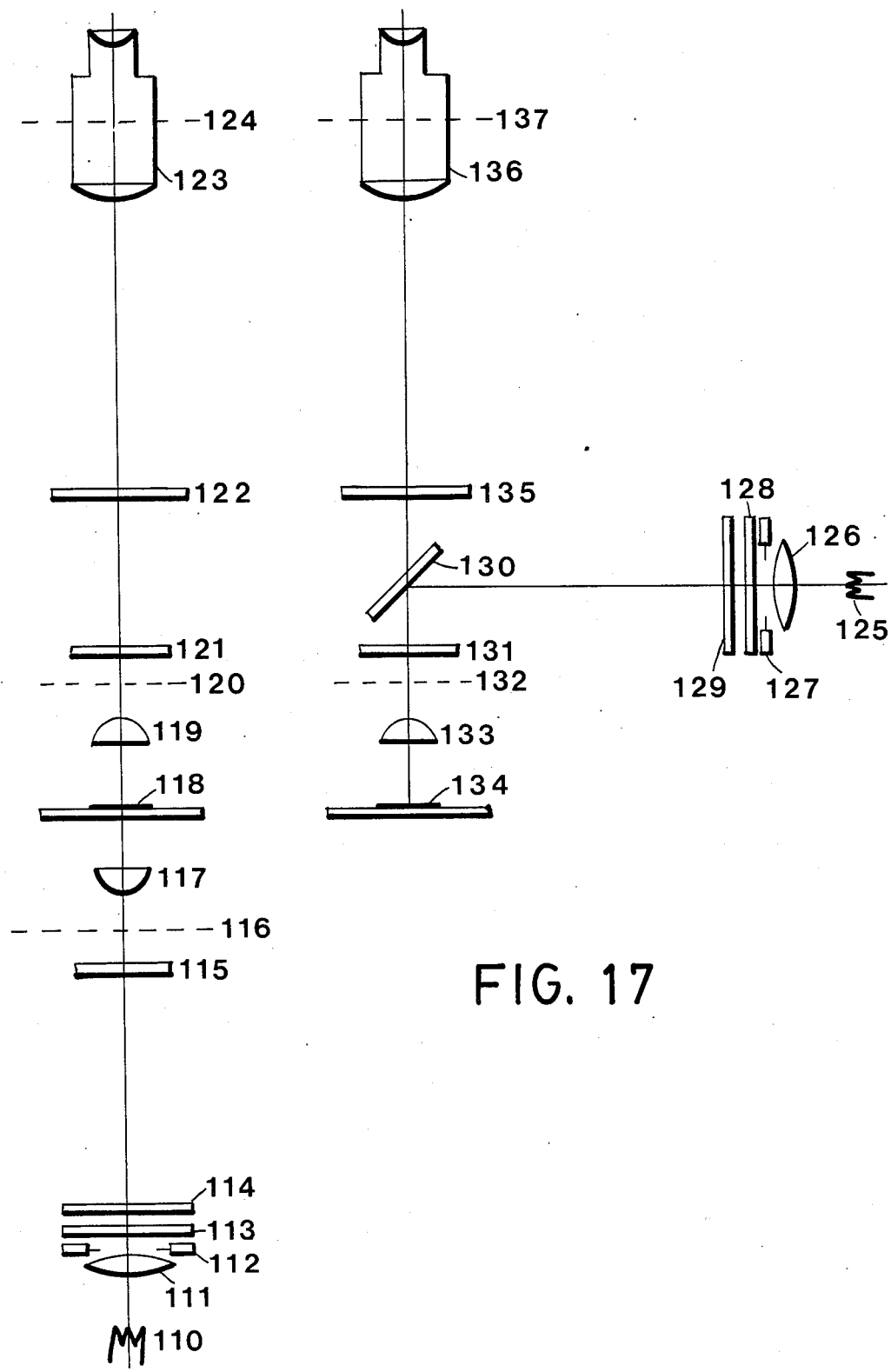
FIGS. 16 and 17 illustrate complete systems for transmitted light and reflected light, respectively.

FIGS. 16 and 17 illustrate complete systems for transmitted light and reflected light, respectively. In FIG. 16, the system is as follows: lamp filament 110, lamp condenser 111, field diaphragm 112, polarizer 113, field compensator 114, compensating beam splitter 115, lower focal plane of condenser 116, condenser 117, object 118, objective 119, rear focal plane of objective 120, principle beam splitter 121, analyzer 122, eyepiece 123, and intermediate image plane 124.

In FIG. 17, the system is: lamp filament 125, lamp condenser 126, field diaphragm 127, polarizer 128, field compensator 129, 45° semi-reflecting glass plate 130, beam splitter 131, rear focal plane of objective 132, objective 133, object 134, analyzer 135, eyepiece 136 and intermediate image plane 137.

What is claimed is:

1. A differential interference contrast microscope including a beam splitter and a compensator, each of said beam splitter and said compensator comprising at least one non-uniformly deformed plastic birefringent component exhibiting linearly graded optical retardation between the ordinary and the extraordinary transmitted rays in one direction across its aperture and constant retardation in the orthogonal direction, said beam splitter being positioned adjacent to and after the objective.

2. The apparatus as claimed in claim 1, wherein said compensator is positioned adjacent to and before the condenser.

3. A beam splitter as claimed in claim 1, said beam splitter comprising two of said non-uniformly deformed plastic components, superposed, said retardations being opposed and orientated in compensating mode, the combination having zero retardation near to its central region.

4. The apparatus as claimed in claim 1, said beam splitter comprising one non-uniformly deformed plastic component and a uniformly deformed plastic component exhibiting uniform retardation, superposed, said uniformly deformed plastic component being oriented in compensating mode, the combination having zero retardation at least near to its central region.

5. The apparatus as claimed in claim 1, said compensator comprising two of said non-uniformly deformed plastic components, superposed, said retardations being opposed and orientated in compensating mode the combination having zero retardation near to its central region.

6. The apparatus as claimed in claim 1, said compensator comprising one non-uniformly deformed plastic component and one uniformly deformed plastic component exhibiting uniform retardation, superposed, said uniformly deformed plastic component being orientated in a compensating mode, the combination having zero retardation near to its central region.

7. The apparatus as claimed in claim 1, each said birefringent component being deformed by being heated to a softening point, stretched and held under tension until cooled.

8. The apparatus as claimed in claim 1, each said birefringent component being deformed by being softened by saturation with the vapour of a solvent, stretched, and held under tension until solvent has evaporated.

9. The apparatus as claimed in claim 3, the component at said beam splitter being positioned between two optically flat glass plates in a medium of matching refractive index.

10. The apparatus as claimed in claim 4, the components at said beam splitter being positioned between two optically flat glass plates in a medium of matching refractive index.

11. The apparatus as claimed in claim 5, the components at said compensator being positioned between two optically flat glass plates in a medium of matching refractive index.

12. The apparatus as claimed in claim 6, the components at said compensator being positioned between two optically flat glass plates in a medium of matching refractive index.

13. The apparatus as claimed in claim 9, said matching refractive index being the mean refractive index of said components.

14. The apparatus as claimed in claim 10, said matching refractive index being the mean refractive index of said components.

15. The apparatus as claimed in claim 11, said matching refractive index being the mean refractive index of said components.

16. The apparatus as claimed in claim 12, said matching refractive index being the mean refractive index of said components.

17. The apparatus as claimed in claim 1, comprising a reflected light differential interference contrast microscope, said beam splitter and said compensator comprising a single unit having at least one non-uniformly deformed plastic birefringent component exhibiting linearly graded optical retardation between the ordinary and the extraordinary transmitted rays in one direction across its aperture and constant retardation in the orthogonal direction.

18. The apparatus as claimed in claim 1, comprising a transmitted light differential interference contrast microscope including a substage condenser having a first focal plane and an objective having a rear focal plane, said beam splitter being positioned before said first focal plane and as close thereto as possible, said compensator being positioned after said rear focal plane and as close thereto as possible.

19. The apparatus as claimed in claim 18, including a further compensator positioned as close as possible to a plane optically conjugate with the image plane of the microscope, said further compensator comprising at least on non-uniformly deformed plastic birefringent component exhibiting linearly graded optical retardation between the ordinary and the extraordinary transmitted rays in one direction across its aperture and constant retardation in the orthogonal direction.

20. The apparatus as claimed in claim 17, said reflected light differential interference contrast microscope including an objective having a rear focal plane, said single unit comprising said beam splitter and said compensator being positioned as close a possible to said rear focal plane.

21. The apparatus a claimed in claim 20, including a further compensator positioned as close as possible to a plane optically conjugate with the image plane of the microscope, said further compensator comprising at least one non-uniformly deformed plastic birefringent component exhibiting linearly graded optical retardation between the ordinary and the extraordinary transmitted rays in one direction across its aperture and constant retardation in the orthogonal direction.

* * * * *

UNITED STATES PATENT AND TRADEMARK OFFICE
CERTIFICATE OF CORRECTION

PATENT NO. : 4,795,246

DATED : January 3, 1989

INVENTOR(S) : Albert Loro

It is certified that error appears in the above-identified patent and that said Letters Patent is hereby corrected as shown below:

Title page, Items [19] and [76], Inventor's last name should read

--Loro--.

Signed and Sealed this

Nineteenth Day of December, 1989

Attest:

JEFFREY M. SAMUELS

Attesting Officer     Acting Commissioner of Patents and Trademarks